United States Patent [19]
Huyer

[11] Patent Number: 5,375,904
[45] Date of Patent: Dec. 27, 1994

[54] SPOILER ROOF

[75] Inventor: Johannes N. Huyer, Velserbroek, Netherlands

[73] Assignee: Vermeulen-Hollandia Octrooien II B.V., Netherlands

[21] Appl. No.: 184,357

[22] Filed: Jan. 21, 1994

Related U.S. Application Data

[63] Continuation of Ser. No. 10,666, Jan. 28, 1993, abandoned.

[30] Foreign Application Priority Data

Jan. 30, 1992 [NL] Netherlands ............................ 9200165

[51] Int. Cl.$^5$ .............................................. B60J 7/047
[52] U.S. Cl. .................... 296/213; 296/216; 296/220
[58] Field of Search ................ 296/213, 214, 216, 220

[56] References Cited

U.S. PATENT DOCUMENTS

| | | | |
|---|---|---|---|
| 4,749,225 | 6/1988 | Fuerst et al. | 296/216 |
| 4,828,318 | 5/1989 | Reintges et al. | 296/213 |
| 4,936,622 | 6/1990 | Yamauchi et al. | 296/213 |
| 5,184,869 | 2/1993 | Bauer | 296/213 |

FOREIGN PATENT DOCUMENTS

| | | | |
|---|---|---|---|
| 0284400 | 9/1988 | European Pat. Off. | |
| 3640168 | 6/1987 | Germany | 296/216 |
| 0071723 | 4/1987 | Japan | 296/220 |
| 2203102 | 10/1988 | United Kingdom | 296/220 |

Primary Examiner—Dennis H. Pedder
Attorney, Agent, or Firm—Westman, Champlin & Kelly

[57] ABSTRACT

A spoiler roof for a vehicle having a roof opening in its fixed roof comprises a frame including on either side of the roof opening longitudinal guide sections. A water gutter normally positioned under the rear edge of the roof opening extends in transverse direction of the vehicle and over the guide sections. A closure element is displaceable from a closed position in the roof opening upwardly and backwardly to an open position above the fixed roof. An adjusting member on either side of the closure element supports the closure element movably and is displaceably guided in the respective guide section. According to the invention, the water gutter is supported by the frame in a manner backwardly movable such that, when the closure element is moved backwardly, the water gutter automatically moves backwardly.

17 Claims, 2 Drawing Sheets

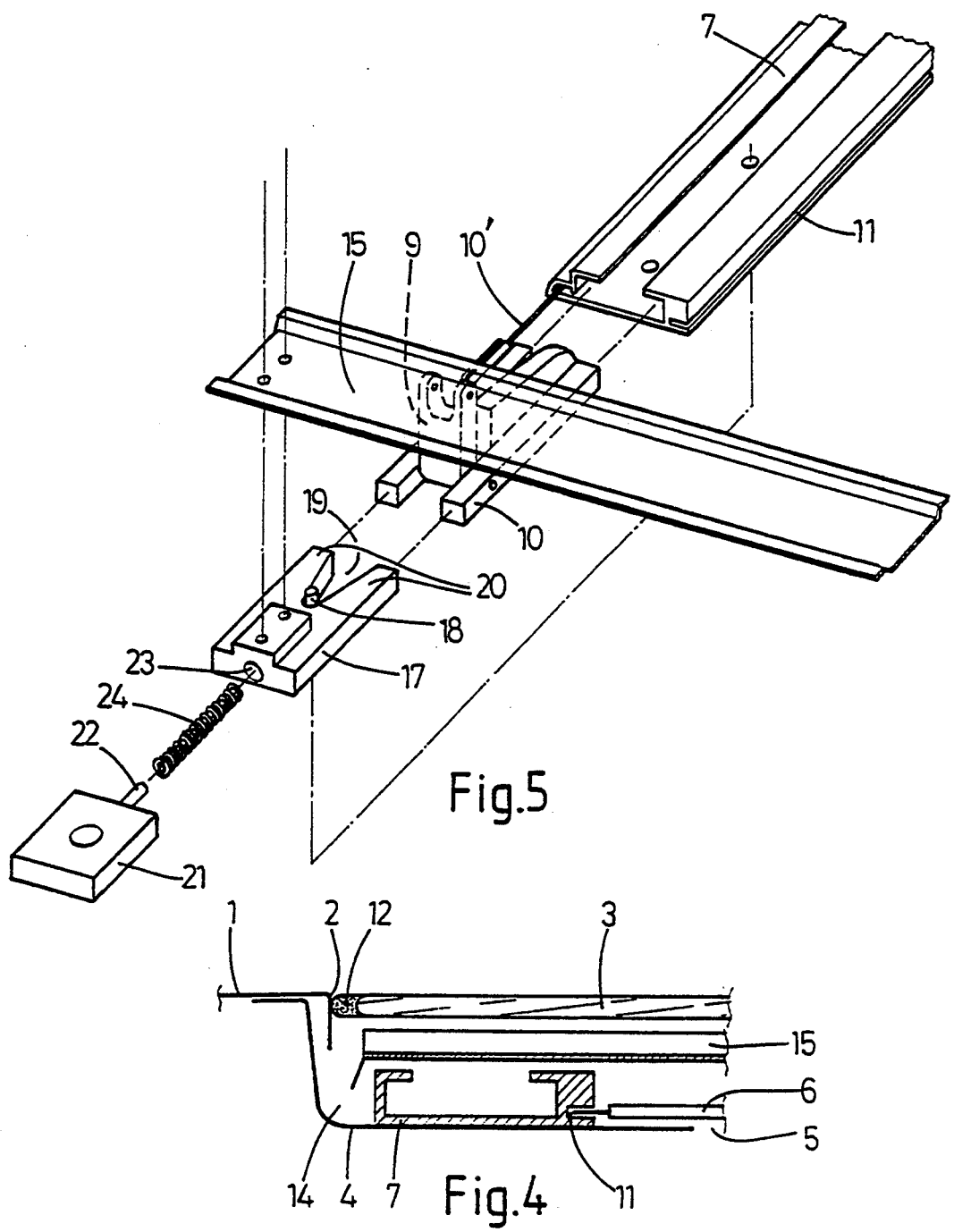

SPOILER ROOF

This is a continuation of application Ser. No. 08/010,666, filed Jan. 28, 1993, now abandoned.

The invention relates to a spoiler roof for a vehicle having a roof opening in its fixed roof, comprising a frame including on either side of the roof opening longitudinal guide sections, and a water gutter normally positioned under the rear edge of the roof opening and extending in transverse direction of the vehicle and at least partially over the guide sections; a closure element displaceable from a closed position within the roof opening in backward direction exclusively to an open position above the fixed roof; and adjusting means on either side of the closure element movably supporting and displaceably guiding the closure element in the respective guide section.

Such a spoiler roof is known from Dutch patent application No. 8702838. In this prior art spoiler roof, the backward displacement of the closure element is restricted, because at a certain moment the adjusting means in the guide sections abuts against the water gutter so that a further backward displacement is not possible. As a result, the maximally obtainable opening between the front side of the panel and the front side of the roof opening is limited.

There is indeed known another embodiment of a spoiler roof in which this problem does not occur since the rear beam of a frame extending in the shape of a ring about the roof opening also functions as a water gutter extending behind the guide sections, but if it is desired to design such a spoiler roof as sun roof having a separate sun shade, then it is necessary to provide separate guides mounted to the lower side of the frame. The guide sections which are already available and intended for the adjusting means cannot serve this purpose because they should then extend through the rear wall of the water gutter.

It is an object of the present invention to provide a spoiler roof of the type mentioned in the preamble, in which it is possible to obtain a large slide opening which is not restricted by the water gutter despite the fact that the water gutter extends over the guide sections.

For this purpose, the spoiler roof according to the invention is characterized in that the water gutter is supported by the frame in a manner backwardly movable such that, when the closure element is moved completely backwardly, the water gutter automatically moves backwardly a distance which is smaller than the backward distance of displacement of the closure element.

Due to the mobility of the water gutter it can be moved out of the way so that the adjusting means is not or less hindered thereby during its backward displacement. If the spoiler roof is provided with an inner screen which is movable independently of the closure element, then it is possible to simply extend the guide sections for the adjusting means backwardly in order to be used also for guiding said inner screen.

It is favourable if the water gutter is moved only a small distance at the end of the backward displacement of the closure element.

In this manner, only the displacement required for moving the water gutter out of the way is to be carried out, so that no unnecessary movements and unnecessary long guides for these movements are required. Furthermore, movement of the water gutter takes place only if it is desired to move the closure element backwards to its furthest open position.

A simple embodiment of the spoiler roof according to the invention is characterized in that the water gutter is movable backwardly by means of the set-out means or an element connected thereto wherein, preferably, the water gutter is supported by supports slidably guided by the guide sections.

In this manner, the water gutter is accurately guided while in the worst case it is for this purpose only necessary to slightly extend the guide section already present. Due to the direct drive of the water gutter by the set-out means or element connected thereto hardly any additional parts for the drive of the water gutter are necessary.

It is favourable when each support is movable between positions defined by stops wherein, preferably, the water gutter is movable to the normal position under the rear edge of the roof opening by spring means.

Due to these features, the water gutter is moved automatically back to the normal position under the rear edge of the roof opening determined by the stop by means of the spring means, when the closure element is moved forwardly again.

The invention will hereafter be elucidated with reference to the drawings showing an embodiment of the spoiler roof according to the invention by way of example.

FIG. 4 is an enlarged sectional view along the line IV—IV of FIG. 1, in which a number of parts is omitted for the sake of clarity.

FIG. 5 is an enlarged perspective exploded view of parts used for moving the water gutter, as seen in the direction of the arrow V in FIG. 1.

Figure 1:
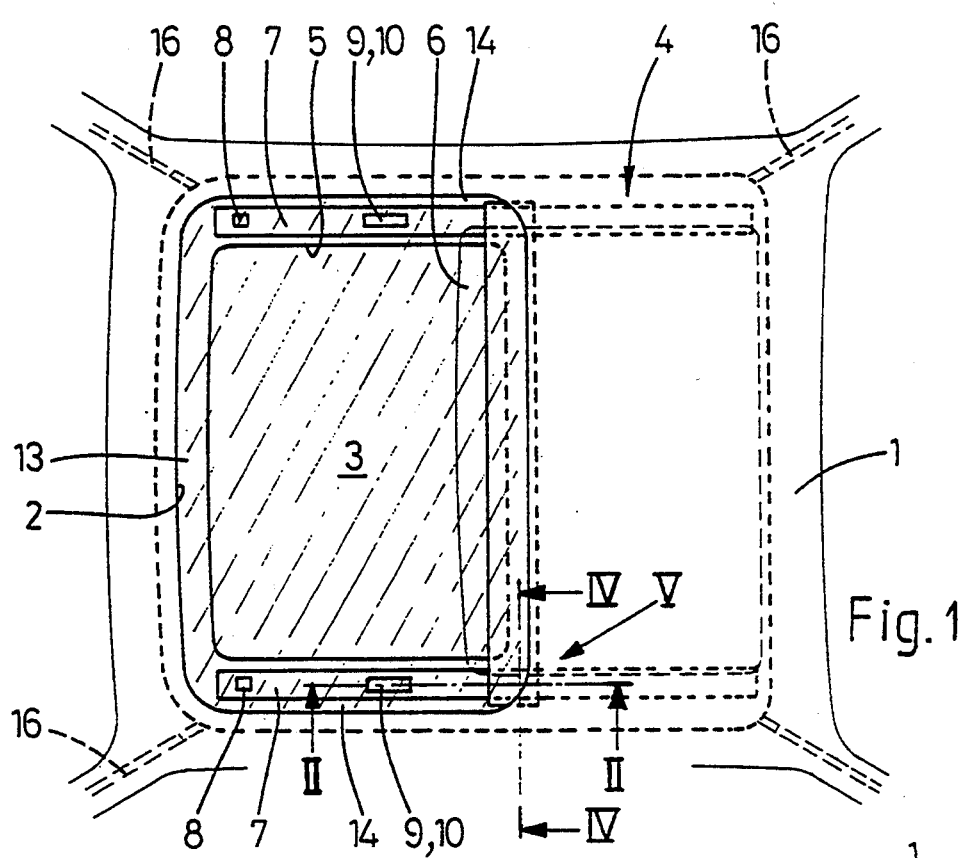
FIG. 1 is a very schematic plan view of a portion of an automobile roof including an exemplary embodiment of the spoiler roof according to the invention.

The drawings show an exemplary embodiment of a spoiler roof intended to be mounted to the fixed roof 1 of a vehicle, such as an automobile, having a roof opening 2. The term spoiler roof is understood to mean that a closure element 3, closing the roof opening 2 in its closed position, is adapted to be moved from this closed position at least backwardly to open positions above the fixed roof 1. In the embodiment shown, the closure element 3 is a panel made from transparent material, such as glass, but in principle it is also possible to make the closure element 3 of opaque material or to construct it in another manner instead of as a single panel. It is for example conceivable to use a multipartite panel or a flexible closure element 3 or the like.

The spoiler roof according to the invention is provided with a frame 4 with a passage opening 5 formed therein in a position under the roof opening 2. This passage opening 5 is closable by means of an inner screen 6 which, in the case of a transparent closure element 3, can be indicated as sun shade and is adapted to be slid from the closed position backwardly under the fixed roof 1. This sliding movement of the sun shade 6 takes place independent of the movements of the panel 3, but it is also conceivable to provide a coupling between the panel 3 and the sun shade 6.

On either side of the roof opening 2, or the passage opening 5, respectively, the frame 4 comprises a guide section 7. This guide section serves to displaceably guide a front support 8 of the panel 3 and an adjusting means 9 arranged at a distance behind it. This adjusting means 9 is illustrated in the drawing in a very simplified manner because the structure thereof forms no essential part of the present invention. The drawing indicates, however, that the adjustment means 9 is provided with a glide shoe 10 arranged in the guide section 7 and driven by a pull and push cable 10' (FIG. 5) being in engagement with a motor or manual crank or the like in order to adjust the panel 3 by means of it.

The adjusting movement of the panel 3 includes pivoting it from the closed position within the roof opening 2 with its rear side upwardly to a venting position and subsequently sliding the panel 3 backwardly in which both the front support 8 and the adjusting means 9 move together with the panel 3. Of course also other movements are conceivable. It is for instance possible that the panel 3 is moved to a less inclined position when it is displaced backwardly.

Both guide sections 7 are further intended to guide the sun shade 6 for which purpose each guide section 7 continues backwardly a distance beyond the roof opening 2 and is provided on its inner side facing the passage opening 5 with a guide groove 11 in which the sun shade 6 runs with its side edges. In the embodiment of the frame 4 shown in the drawing by way of example, it continues backwardly beyond the roof opening 2 so that the frame 4 fully supports both guide sections 7 and the sun shade 6 being received between the fixed roof 1 of the vehicle and the rear portion of the frame 4 when it is slid backwardly. Of course, it would also be possible to end the frame slightly beyond the rear edge of the roof opening 2 so that the guide sections 7 project backwardly.

For receiving any leakage seeping between the seal 12 at the circumference of the panel 3 and the edge of the roof opening 2, the frame is provided with water receiving means. On the front edge and the side edges of the roof opening 2, the water receiving means are formed by a front portion 13 of the frame 4 and lateral portions 14 lying outwardly of the guide sections 7 (c.f. FIG. 4). For receiving leakage at the rear edge of the roof opening 2, the frame 4 is provided with a separate water gutter 15 extending in transverse direction with its ends over the respective guide sections 7 in order to open above the lateral water receiving portions 14 of the frame 4. Water tubes 16 connecting to the front and lateral portions 13 and 14 of the frame 4 allow the discharge of leakage to outside the automobile.

Figure 2:
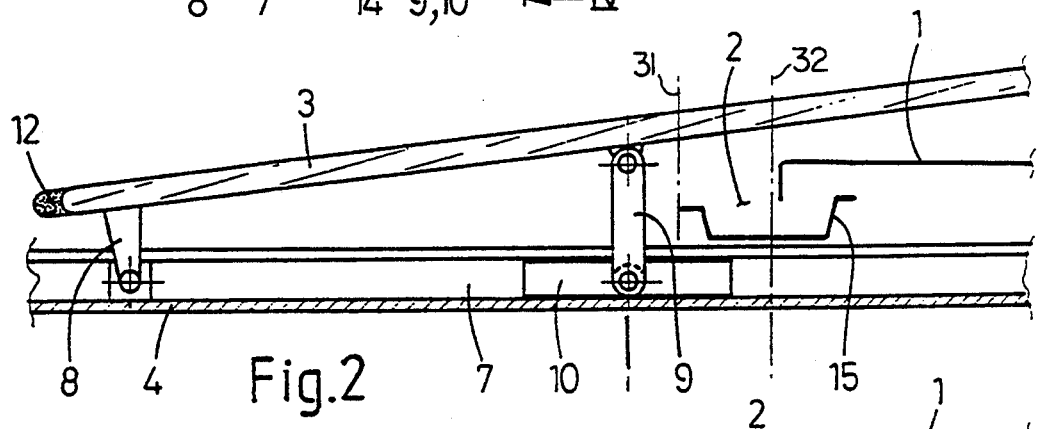
FIG. 2 is an enlarged schematic sectional view along the line II—II of FIG. 1, in which the closure element is almost in the completely backwardly displaced position.
Figure 3:
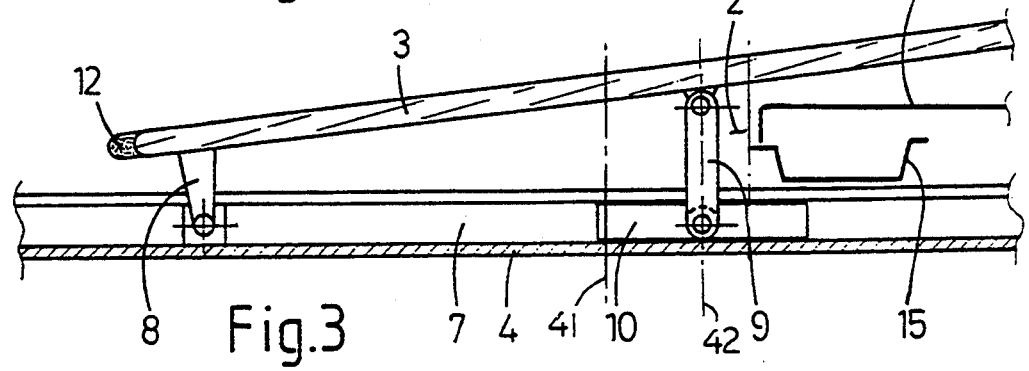
FIG. 3 is a sectional view corresponding to that of FIG. 2 but illustrating the closure element in the completely backwardly displaced position.

FIG. 2 shows that, when the panel 3 is displaced backwardly, the adjusting means 9 would abut against the water gutter 15 thereby restricting the sliding movement of the panel 3. In order to prevent this, the invention proposes to support the water gutter 15 in a movable fashion so that it can be displaced backwardly to a position as indicated by line 32 under the fixed roof 1 such that the backward sliding movement of the adjusting means 9 is only limited by the rear edge of the roof opening 2. This allows the panel 3 to be moved a few centimeters extra backwardly so that a greater portion of the roof opening 2 may be opened as illustrated by FIG. 3.

FIG. 5 shows the parts for movably supporting the water gutter 15. These parts include a support 17 on each end of the water gutter 15, slidably received within the backwardly extended guide section 7. For this purpose, the water gutter 15 is fixed on both supports 17 by fastening means, such as screws, not shown in further detail. Each support 17 is movable in longitudinal direction of the guide section 7 a limited distance between stops of which a front stop 18 is formed by a vertical pin fixed to the guide section 7 in the path of the support 17. On its front side the support 17 has a V-shaped groove 19 forming two forwardly projecting legs 20 allowed to project forwardly beyond the front stop 18. A rear stop 21 is formed by a stop block secured backwardly of the support 17 to the guide section 7. The rear stop 21 includes a forwardly projecting pin 22. On the other side, the support 17 comprises a longitudinal hole 23 adapted to receive the pin 22 and wherein a helical spring 24 extends around the pin 22 and is inserted in the longitudinal hole 23 to load the support 17 in forward direction to its normal position against the front stop 18, in which position the water gutter 15 is under the rear edge of the roof opening 2.

The operation of the movable support of the water gutter 15 is simple and is clear from FIG. 5. At a backward displacement of the adjusting means 9 by means of the glide shoe 10, this glide shoe 10 in each guide section 7 comes into contact with the legs 20 of the support 17 in the position of the panel 3 as shown in FIG. 2 as indicated by line 41. From that moment on, a further backward displacement will cause each support 17 to be pushed backwardly against the spring force of the helical spring 24 by the respective glide shoe 10 thereby carrying the water gutter 15 and as a result both adjusting means 9 do not collide with the water gutter 15. The panel 3 cannot be slid further backwardly when both supports 17 of the water gutter 15 abut against the rear stops 21. Then a mechanically blocked end position as indicated by line 42 is obtained in which the adjusting means 9 are still free from the rear edge of the roof opening 2.

When the panel 3 is moved again from this fully open position back to the closed position, the glide shoes 10 together with the adjusting means 9 are displaced in reverse sense, that is to the front, in which both supports 17 will follow the movement of the glide shoes 10 due to the pressure force of the helical springs 24 until both supports have run against the respective front supports 18. The supports 17 and hence the water gutter 15 then remain stationary as indicated by line 31 when the glide shoes 10 move further forwardly. The water gutter 15 is then in its normal position as indicated by 31 again under the rear edge of the roof opening 2.

The invention is not restricted to the embodiment shown in the drawing and described herein before, which may be varied in different manners within the scope of the invention. For example, it is possible to move the water gutter away already at the beginning of the rearward sliding movement of the panel. Also, both the forward and backward movements of the water gutter may be positively controlled, for example by means of a coupling which might or might not be unlocked. Furthermore, it is conceivable to make only that part of the water gutter movable which stands in the way. Regarding the water receiving means on the side edges of the roof opening it is noted that they might be combined with the guide sections so that they form part of the same component.

I claim:

1. A spoiler roof for a vehicle having a roof opening (2) in its fixed roof (1), comprising a frame (4) including on either side of the roof opening (2) longitudinal guide sections (7), and water collecting means (15) for collecting water from a rear edge of the roof opening (2), the water collecting means (15) being moveable between a first position under the rear edge to a second position backwardly displaced from the first position and under the fixed roof (1), the water collecting means (15) extending in a transverse direction of the vehicle and at least partially over the longitudinal guide sections (7); a closure element (3) displaceable from a closed position closing the roof opening (2) in a backward direction to an open position above the fixed roof (1); adjusting means (9, 10) for adjustably displacing the closure element (3) from and to the closed position, the adjusting means (9, 10) movably supporting and displaceably guiding the closure element (3) on the longitudinal guide sections (7) from an initial adjusting means position wherein the closure element (3) is in the closed position to a final adjusting means position wherein the closure element (3) is in the open position; means for moving the water collecting means (15) from the first position to the second position to allow the adjusting means (9, 10) to be guided by the longitudinal guide sections (7) from the initial adjusting means position to the final adjusting means position, wherein the first position is located between the initial adjusting means position and the final adjusting means position; and spring means for returning the water collecting means (15) from the second position to the first position with return of the closure element (3) to the closed position.

2. The spoiler roof according to claim 1 wherein, the means for moving initiates movement of the water collecting means only when the adjusting means (9, 10) has obtained a selected backwardly displaced position between the initial adjusting means position and the final adjusting means position.

3. The spoiler roof according to claim 2, wherein the means for moving the water collecting means (15) releasably engages the adjusting means (9, 10).

4. The spoiler roof according to claim 2 wherein a distance between the first and second positions moved by the water collecting means (15) is less than a distance between the initial adjusting means position and the selected backwardly displaced position moved by the adjusting means (9, 10).

5. The spoiler roof according to claim 3, wherein the means for moving the water collecting means (15) includes supports (17) attached to the water collecting means (15) and slidably guided by the longitudinal guide sections (7).

6. The spoiler roof according to claim 5, wherein the means for moving the water collecting means (15) includes a portion of the adjusting means (9, 10) selectively contacting the supports (17).

7. The spoiler roof according to claim 1, wherein the means for moving the water collecting means (15) includes supports (17) attached to the water collecting means (15) and slidably guided by the longitudinal guide sections (7).

8. The spoiler roof according to claim 1, wherein each support (17) is movable between positions defined by stops (18, 21).

9. The spoiler roof according to claim 7, wherein the means for moving the water collecting means (15) includes a portion of the adjusting means (9, 10) selectively contacting the supports (17).

10. The spoiler roof according to claim 8, wherein the stops 18, 21) correspond to the first and second positions of the water collecting means (15).

11. The spoiler roof according to claim 1, wherein the spring means comprises a spring which engages the means for moving.

12. The spoiler roof according to claim 11, wherein the means for moving comprises a support (17) slidably guided on one of the longitudinal guide sections (7), and wherein the spring is compressed between the support (17) and a stop corresponding to the second position of the water collecting means (15) when the water collecting means (15) is moved from the first position to the second position.

13. The spoiler roof according to claim 12, wherein the spring is a helical spring.

14. The spoiler roof according to claim 1, wherein the frame (4) is provided under the roof opening (2) with a passage opening (5) closable by a slidable inner screen (6) which is displaceable backwardly under the fixed roof (1) for opening the passage opening (5), the inner screen (6) being guided in said longitudinal guide sections (7) extending backwardly beyond the roof opening (2).

15. The spoiler roof according to claim 14, wherein the frame extends about the entire roof opening (2) and backwardly thereof and the longitudinal guide sections (7) are mounted on the frame (4).

16. The spoiler roof according to claim 14, wherein the closure element (3) is formed of a transparent rigid panel, and the inner screen (6) is a sun shade.

17. The spoiler roof according to claim 1 wherein the water collecting means (15) comprises a portion overlapping and extending between the longitudinal guide sections (7).

* * * * *